S. H. McCAIN, Jr.
NUT LOCK.
APPLICATION FILED MAR. 25, 1920.
1,350,230.
Patented Aug. 17, 1920.
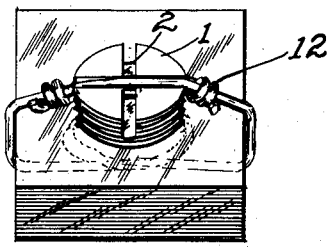
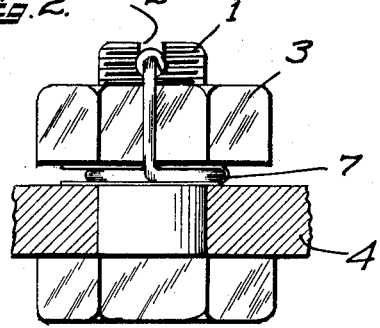
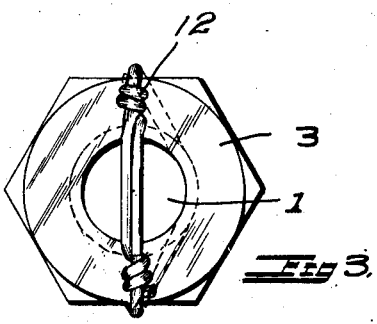
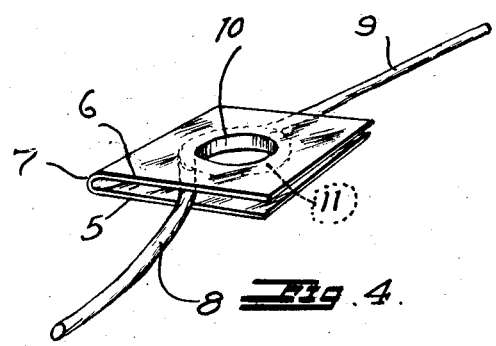
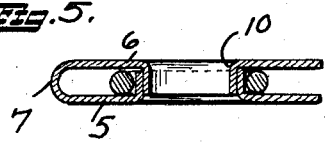
INVENTOR.
Samuel H. McCain Jr.
BY
Carlos P. Griffin
ATTORNEY.

UNITED STATES PATENT OFFICE.

SAMUEL H. McCAIN, JR., OF SAN FRANCISCO, CALIFORNIA.

NUT-LOCK.

1,350,230.  Specification of Letters Patent.  Patented Aug. 17, 1920.

Application filed March 25, 1920. Serial No. 368,544.

*To all whom it may concern:*

Be it known that I, SAMUEL H. McCAIN, Jr., a citizen of the United States, residing at San Francisco, in the county of San Francisco, State of California, have invented a new and useful Nut-Lock, of which the following is a specification in such full and clear terms as will enable those skilled in the art to construct and use the same.

This invention relates to a nut lock and its object is to produce a nut lock which is capable of securing a nut in a given position without the use of special forms of nuts and which can be easily applied to any bolt if the bolt has not been especially made therefor, by sawing a notch in the end of the bolt.

Other objects of the invention will appear as the description proceeds.

An embodiment of the invention is shown in the accompanying drawings in which the same reference numeral is applied to the same portion throughout, but I am aware that there may be modifications thereof.

Figure 1 is a perspective view of one end of the bolt having a nut and this nut lock applied thereto.

Fig. 2 is a side elevation of a bolt showing it applied to an object and showing the nut lock in place.

Fig. 3 is a plan view of the bolt with the nut thereon and showing the nut lock secured.

Fig. 4 is a perspective view of the nut lock alone.

Fig. 5 is a sectional view of the nut lock showing more clearly the eyelet.

The numeral 1 indicates the bolt which has one or more open slots 2 cut in its threaded end. The bolt has an ordinary nut 3 applied thereto and between the object 4 to which the bolt is applied and the nut 3 there is a washer with the wings 5 and 6 bent around the line 7 to overlie each other. Between the washer wings 5 and 6 is a wire having the ends 8 and 9 extending away from the washer a short distance.

The washer is formed down at 10 to form an eyelet around which the wire can be bent as indicated at 11 for holding the wire in place. In use the washer is placed in the nut as indicated in Fig. 2 and the nut is tightened down upon the washer, after which the ends of the wires are passed through one of the slots in the top of the bolt and the two wires are then wound together as indicated at 12, Figs. 1 and 3.

What I claim is as follows, but various modifications may be made in the construction shown in the drawings and above particularly described form, within the purview of my invention.

A nut lock comprising a pair of overlying wings forming a washer, said wings having an eyelet formed at the center to receive a bolt and a wire surrounding the eyelet and having its ends extending from the washer.

In testimony whereof I have hereunto set my hand this 17th day of March, A. D. 1920.

SAMUEL H. McCAIN, JR.